(12) United States Patent
Hu et al.

(10) Patent No.: US 12,108,902 B2
(45) Date of Patent: Oct. 8, 2024

(54) SCREW ASSEMBLY FOR FOOD PROCESSOR

(71) Applicant: GUANGDONG MIDEA CONSUMER ELECTRIC MANUFACTURING CO., LTD., Foshan (CN)

(72) Inventors: Donghui Hu, Foshan (CN); Houcai Guo, Foshan (CN); Jianfei Xu, Foshan (CN)

(73) Assignee: GUANGDONG MIDEA CONSUMER ELECTRIC MANUFACTURING CO., LTD., Foshan (CN)

( * ) Notice: Subject to any disclaimer, the term of this patent is extended or adjusted under 35 U.S.C. 154(b) by 0 days.

(21) Appl. No.: 18/320,990

(22) Filed: May 21, 2023

(65) Prior Publication Data

US 2023/0292948 A1    Sep. 21, 2023

Related U.S. Application Data

(63) Continuation of application No. 16/649,118, filed as application No. PCT/CN2018/098553 on Aug. 3, 2018, now Pat. No. 11,690,469.

(30) Foreign Application Priority Data

Sep. 28, 2017 (CN) .......................... 201721266292.9
Feb. 24, 2018 (CN) .......................... 201820265922.9

(51) Int. Cl.
*A47J 19/02* (2006.01)
*A47J 43/07* (2006.01)

(52) U.S. Cl.
CPC ......... *A47J 19/025* (2013.01); *A47J 43/0722* (2013.01)

(58) Field of Classification Search
CPC ........ A47J 19/025; A47J 19/06; A47J 19/027; A47J 19/02; A47J 19/00; A47J 43/046; A47J 43/04; A47J 43/07; A47J 19/023; A47J 36/00; A47J 36/14; A47J 43/042; A47J 43/0716; A47J 43/085; A47J 43/24; A47J 43/255; A47J 47/01; A23N 1/02; A23N 1/00; B30B 9/12; B30B 9/128; B30B 9/14; B30B 9/121; B30B 9/16; B30B 9/02; B30B 9/127; A23L 5/15; B02C 23/10; B65D 47/261
USPC ......... 99/510, 512, 509, 511, 495, 501, 502, 99/330, 407, 492; 100/117, 145, 131; 366/133, 186, 157.3, 194, 249, 266, 318; 426/509
See application file for complete search history.

(56) References Cited

PUBLICATIONS

Lu, CN 204764926 U (Year: 2015).*

* cited by examiner

*Primary Examiner* — Vy T Nguyen

(57) ABSTRACT

Embodiments provide a screw, a food processing cup assembly, and a food processor. The screw includes a screw body including a feeding area for feeding and a crushing area connected to the feeding area; a first spiral rib is spirally arranged on the feeding area along the axial direction of the screw body, and extending to the crushing area along a top of the screw body; a cutting surface extending from the top of the screw body to the crushing area; second spiral ribs are disposed on the screw body at intervals along the axial direction of the screw body.

20 Claims, 10 Drawing Sheets

SCREW ASSEMBLY FOR FOOD PROCESSOR

CROSS-REFERENCES TO RELATED APPLICATIONS

The present disclosure is a Continuation application of U.S. application Ser. No. 16/649,118, filed on Mar. 19, 2020, which claims the priority of Chinese Application No. 201721266292.9 filed in the Chinese Patent Office on Sep. 28, 2017 and Chinese Application No. 201820265922.9 filed in the Chinese Patent Office on Feb. 24, 2018, the entireties of which are herein incorporated by reference.

FIELD

The present disclosure relates to the field of kitchen appliances, and more particularly, to a screw, a food processing cup assembly, and a food processor.

BACKGROUND

In the pressing system of the existing liquidizer on the market, when the screw is in contact with the food materials at the feeding inlet of the cup cover, because there is no convex rib or the convex rib is small at the feeding area, the large pieces of food materials cannot be fully cut open enough to be conveyed to the crushing area, which causes the food materials being prone to unsmooth during the juice extraction process, the food materials move at the feed port, and the screw shaft rotates to squeeze the food materials to slip, and the push rod may be used to assist extrusion. As a result, the operation of the juice extraction process is complicated, the food materials cannot automatically and smoothly extract juice, and the user experience is poor.

Therefore, designing a screw, a food processing cup assembly, and a food processor that is convenient for cutting large pieces of the food materials to ensure that the food materials can smoothly enter the crushing area has become an urgent problem to be solved.

SUMMARY

One embodiment of the present disclosure provides a screw.

One embodiment of the present disclosure provides a food processing cup assembly.

One embodiment of the present disclosure provides a food processor.

In view of the foregoing, the present disclosure provides a screw, comprising: a screw body including a feeding area for feeding and a crushing area connected to the feeding area; a first spiral rib extending along a top of the screw body to a bottom of the screw body, the first spiral rib includes a cutting section and a crushing section, the cutting section is extended to a direction from the top of the screw body close to the bottom of the screw body, one end of the crushing section is connected to the cutting section, and the other end of the crushing section is extended to the bottom of the screw body; a cutting surface disposed on the feeding area and extending downward from the top of the screw body; and second spiral ribs disposed on the screw body at intervals along the axial direction of the screw body.

The screw provided by the present disclosure comprises a screw body, a first spiral rib, a cutting surface, and second spiral ribs. The screw body is divided into an upper feeding area and a crushing area below the feeding area, and the feeding area cooperates with the feeding port of the food processor, that is, the food materials to be crushed may reach the feeding area of the screw body from the feeding port, and is then crushed in the spiral crushing area and discharged from the crushing area. The first spiral rib extends along the top of the screw body to the bottom of the screw body. The first spiral rib comprises the cutting section and the crushing section. The cutting section extends to a direction from the top of the screw body close to the bottom of the screw body, one end of the crushing section is connected to the cutting section, and the other end of the crushing section extends to the bottom of the screw body; the cutting surface is disposed on the feeding area and extends downward from the top of the screw body. When the screw body is rotated, the food materials is not raised by the outer wall of the screw body and cannot easily enter the feeding area and the crushing area, the cutting surface provides support for the food materials entering through the feeding port of the food processor, to make the food materials move with the screw body. At the same time, the cutting surface can ensure that the contact area between the food materials and the screw is increased, to increase the friction between the food materials and the screw, and ensuring that the food materials can be fed from the feeding area to the crushing area during rotation; the cutting section of the first spiral rib can cut the food materials supported by the cutting surface before entering the crushing area, so that larger pieces of food materials can be cut into smaller volumes by the cutting section, which is convenient for improving the crushing efficiency when crushing in the subsequent extrusion section. By setting the first spiral rib and the cutting surface, when the food materials has just entered the feeding area, they can be supported by the cutting surface and cut through the cutting section, which effectively prevents the occurrence of food materials slipping, reduces the auxiliary squeeze of pushing rod, and improves the convenience of operation.

In addition, the screw provided in the above-mentioned embodiments of the present disclosure also has the following additional features.

In the above-mentioned embodiments, a starting end of the first spiral rib is at least partially disposed on the cutting surface, so that the first spiral rib partially overlaps the cutting surface, and the overlapping portion of the first spiral rib is removed by the cutting surface.

In the embodiments, in order to enable the food materials supported by the cutting surface to be directly cut by the first spiral rib and reduce the time of rotation on the screw, the cutting surface is set to partially overlap the first spiral rib and the overlapping portion of the first spiral rib is removed by the cutting surface, that is, the overlapping portion is set as a part of the cutting surface, which ensures that the food materials supported by the cutting surface during rotation does not need to pass through other areas and directly enters the first spiral rib for cutting, and ensures the coherence and efficiency of the internal movement of the screw, and improved the cutting efficiency of the first spiral rib.

In any of the above-mentioned embodiments, on a longitudinal section formed by the first spiral rib passing through a centerline of the screw body, a width of the first spiral rib decreases outward from the screw body.

In the embodiment, on a longitudinal section formed by the first spiral rib passing through a centerline of the screw body, a width of the first spiral rib decreases outward from the screw body, that is, the first spiral rib is set to increase in thickness from the blade edge to the blade root in order. This setting can ensure that, when cutting large pieces of the food materials, the blade edge first contacts the food materials, and the thinner blade edge can be quickly inserted into the interior of the food materials, and as the screw body drives the first spiral rib to rotate, the first spiral rib is inserted deeper and deeper into the food materials, after the thicker blade root is inserted into the interior of the food materials, it has a greater cutting force to cut the food materials, so that the cutting effect of the first spiral rib is improved.

In any of the above-mentioned embodiments, the area of each of the longitudinal sections of the crushing section passing through the centerline of the screw body from top to bottom is reduced.

In the embodiment, the area of the longitudinal section of the cutting section in the centerline of the screw body gradually increases until the blade edge of the first spiral rib extends downward to leave the top surface of the screw body, and the blade edge of the crushing section is started to set from the position where it is turned away from the top surface of the screw body, and in order to ensure that the feeding area enters the crushing area enough, it is necessary to set the thickness of the crushing section to gradually decrease, ensuring that a larger area is set on the surface of the screw body to transport the food materials.

In any of the above-mentioned embodiments, on the longitudinal section formed by the crushing section passing through the centerline of the screw body, an upper side wall of the crushing section is a downwardly concave arc.

In the embodiment, on the longitudinal section formed by the crushing section passing through the centerline of the screw body, an upper side wall of the crushing section is a downwardly concave arc, that is, the upper wall of the crushing section is not a flat surface but an inner concave, so that the food materials cut by the first spiral rib can fall on the upper wall of the recess, and through the concave surface, enough food materials are driven to rotate to the second spiral rib of the crushing area to prevent the food materials cut by the first spiral rib dropping.

In any of the above-mentioned embodiments, a cross-sectional area of the screw body increases from the feeding area to the crushing area.

In the embodiment, a cross-sectional area of the screw body increases from the feeding area to the crushing area, that is, the screw body has a substantially tapered shape, and the taper of the tapered shape may be in the range of 3° to 15°, further may be 5°, this kind of setting can twist and crush food when using the screw for food processor to crush food, so it can improve the food crushing effect of food processor to improve the juice yield.

In any of the above-mentioned embodiments, on the longitudinal section passing through the centerline of the screw body, the vertical distance from a blade edge of the first spiral rib to the centerline of the screw body is greater than or equal to the vertical distance from a top of the second spiral rib to the centerline of the screw body.

In the embodiment, on the longitudinal section passing through the centerline of the screw body, the vertical distance from a blade edge of the first spiral rib to the centerline of the screw body is greater than or equal to the vertical distance from a top of the second spiral rib to the centerline of the screw body. At the same time, the screw body has a substantially tapered shape, that is, the width of the screw body provided with the first spiral rib portion is smaller than the width of the screw body provided with the second spiral rib portion, which can ensure that the area surrounded by the first spiral rib and the screw body is larger than the area surrounded by the second spiral rib and the screw body, so that it is possible to quickly cut more food materials into small pieces when cutting the food materials, and when squeezing and crushing the small pieces of food materials, each time the food is crushed, the space is getting smaller and smaller to ensure a good juice output when the food is crushed.

In any of the above-mentioned embodiments, the first spiral rib is extended to the crushing area and connected to the second spiral rib on the crushing area, the connection between the first spiral rib and the second spiral rib is a smooth transition.

In the embodiment, when the first spiral rib is rotated on the screw body, the first spiral rib extends downward to the crushing area and is connected to the second spiral rib on the crushing area, so that the small food materials cut by the first spiral rib can be moved along the side wall of the first spiral rib to the second spiral rib directly for squeezing and crushing, and the connection between the first spiral rib and the second spiral rib is a smooth transition to ensure that the food materials will not get stuck at the junction of the first spiral rib and the second spiral rib.

In any of the above-mentioned embodiments, the first spiral rib and the second spiral rib are an integrated structure.

In the embodiment, the first spiral rib and the second spiral rib may be an integrated structure. Because the integrated structure has good mechanical properties, it can improve the connection strength between the first spiral rib and the second spiral rib. In addition, the first spiral rib and the second spiral rib can be made into one body and mass-produced to improve the processing efficiency of the product and reduce the processing cost of the product.

The embodiments of the present disclosure provides a screw, comprising: a screw body, a cutting surface is provided on a side of the screw body, the cutting surface is extended from a top surface of the screw body to a bottom surface of the screw body, and an angle between the cutting surface and the top surface of the screw body is $\alpha$, and $90°<\alpha\leq150°$; and a first spiral rib provided on the side of the screw body, and the first spiral rib is extended spirally from the top surface of the screw body to the bottom surface of the screw body.

The screw provided according to the present disclosure comprises a screw body and a first spiral rib, in one embodiment, a side of the screw body is provided with a cutting surface, and the cutting surface is provided downward from the top of the screw body, and the first spiral rib is provided at the side of the screw body, it also extends downward from the top of the screw body. By setting the cutting surface and the angle between the cutting surface and the top surface of the screw body in a range of $90°<\alpha\leq150°$, the cutting surface can be extended downward from the top surface of the screw body, that is, the cutting surface can be set from the top to the bottom of the screw body, the screw body can be tilted and recessed at the cutting surface, so that the upper end of the screw body can be formed into a buckle shape. After the food materials are put into the feeding cup, the food materials will be buckled on the cutting surface by the cutting surface, that is, the cutting surface can apply a pressure to the food materials to press the food materials so that the food materials will not be lifted by the outer wall of the screw body, so that the food materials can be prevented from slipping or retreating during feeding, the food materials can be fixed between the cutting surface and the inner wall surface of the feeding cup during feeding, so that, when the screw rotates, the cutting surface can be used to preliminarily squeeze the food materials together with the sidewall of the feeding cup to achieve the preliminary processing of the food materials. The first spiral rib spirally extends downward from the top of the screw, so that the food materials have been initially processed can be further cut and squeezed under the action of the first spiral rib, and flow down the first spiral rib, so that the feeding operation of food materials can be completed. This kind of setting can set the cutting surface and reasonably set the tilt angle of the cutting surface, so that the cutting surface can be used to press the food materials during feeding, therefore it can prevent the food materials from slipping or retreating from cutting normally, thus making food materials can be smoothly cut by the screw and conveyed to the bottom of the screw, in this way, when feeding, the auxiliary pushing action of the push rod can be reduced, which can reduce the operation of the user and improve the convenience of juice extraction. By setting the angle α between the cutting surface and the top surface of the screw body in a range of 90°<α≤150°, the cutting surface can have a reasonable tilt angle inward, so that the pressing force of the cutting surface on the food materials can be controlled reasonably, therefore the cutting surface can press down the food materials and make the outer surface of the screw body smoother, not to jam the food materials, which can prevent the food materials from slipping and retreating, at the same time, the food materials can flow down smoothly.

In one embodiment, the angle α between the cutting surface and the top surface of the screw body is greater than or equal to 95° and less than or equal to 150°, such as α is 100°, or α is 120°, or α is 130°.

In one embodiment, it is explained here that the angle α between the cutting surface and the top surface of the screw body is the angle between the two planes when the cutting surface is a plane, but when the cutting surface is an arc-shaped surface, the angle α between the cutting surface and the top surface of the screw body is the angle between the surface of each cross section of the cutting surface and the top surface of the screw body.

In addition, the screw provided in the above embodiment of the present disclosure also has the following additional features.

In the above-mentioned embodiment, a top of the first spiral rib is connected to one side of the cutting surface, or a top surface of the cutting surface partially extends to the first spiral rib.

In the embodiment, the top of the first spiral rib is connected to one side of the cutting surface, that is, the first spiral rib starts from one side of the cutting surface and spirals downward from the top of the screw, so that the cutting surface and the first spiral rib can smoothly transition, therefore the food materials that is initially squeezed and cut by the cutting surface can be conveyed down the first spiral rib to smoothly feed the materials, which can reduce the length of time that the food materials rotates on the screw and make the food materials directly enter the first spiral rib without going through other areas, to ensure the continuity and efficiency of the internal action of the screw, and improving the cutting efficiency of the cutting rib. Further, the top surface of the cutting surface partially extends to the first spiral rib, that is, the starting end of the first spiral rib is at least partially set on the cutting surface, so that the starting end of the first spiral rib partially overlaps the cutting surface, and the overlapping portion of the cutting section is removed by the cutting surface. This ensures that the food materials directly enters the first spiral rib without going through other areas during rotation and ensures the continuity and efficiency of the internal action of the screw and improves the cutting efficiency of the first spiral rib.

In any of the above-mentioned embodiments, the screw body is further provided with a transition surface, one end of the transition surface is smoothly connected to one end of the cutting surface close to the bottom surface of the screw body, and the other end of the transition surface extends toward the bottom surface direction of the screw body.

In the embodiment, by setting the transition surface, it can make a smooth transition connection between the cutting surface and the rest of the screw outer surface, and can prevent the screw body from forming a dead angle at the lower end of the cutting surface to jam the food materials, so that the food materials can flow down smoothly.

In any of the above-mentioned embodiments, the transition surface is an arc-shaped surface, and/or the cutting surface is an arc-shaped surface.

In the embodiment, by setting the transition surface and the cutting surface to be arc-shaped surfaces, the transition surface and the cutting surface can be made smoother, so that the transition surface and the cutting surface can be prevented from appearing dead angles and can make the food materials flow more smoothly and improve the flow of food materials and the product efficiency.

In any of the above-mentioned embodiments, the screw body comprises a feeding area, a squeezing area, and a grinding area in order from the top surface of the screw body to the bottom surface of the screw body, the first spiral rib comprises a cutting section correspondingly provided in the feeding area, a crushing section correspondingly provided in the squeezing area, and a grinding section correspondingly provided in the grinding area, and the cutting surface is only provided on the feeding area.

In the embodiment, the screw body is divided into three areas from the top to the bottom, namely the feeding area, the squeezing area and the grinding area, and, the feeding area is mainly used for feeding, and the squeezing area is mainly used for preliminary squeezing of the food materials to squeeze the food materials into smaller pieces, and the grinding area is mainly used for fine-grinding the food materials so that the food materials can be squeezed and cut into smaller pieces. The cutting surface is only set on the feeding area to prevent the food materials from slipping and retreating when feeding. The first spiral rib corresponding to the three areas of the screw body is also divided into three sections, namely the cutting section, the crushing section and the grinding section, and the cutting section is mainly used for preliminary squeezing and cutting of the food materials during feeding to achieve the preliminary processing of the food materials, the crushing section is used for squeezing of the food materials, and the grinding section is mainly used for more fully squeezing the food materials, that is, fine-grinding, so that the food materials can be processed to be more broken.

In one embodiment, since the squeezing area and the grinding area both perform squeezing and crushing process on the food materials, the squeezing area and the grinding area can also be collectively referred to as the squeezing area.

In any of the above-mentioned embodiments, the cutting section, the crushing section and the grinding section are an integrated structure.

In the embodiment, the cutting section, the crushing section and the grinding section may be an integrated structure, because the mechanical properties of the integrated structure are good, so the connection strength between the cutting section, the crushing section and the grinding section can be improved. In addition, the cutting section, the crushing section and the grinding section can be made into one body and mass-produced to improve the processing efficiency of the product and reduce the processing cost of the product.

In any of the above-mentioned embodiments, the cross-sectional area of the cutting section is larger than the cross-sectional area of the crushing section, and/or the cross-sectional area of the crushing section is larger than the cross-sectional area of the grinding section.

In the embodiment, the cross-sectional area of the cutting section is larger than the cross-sectional area of the crushing section, and the cross-sectional area of the crushing section is larger than the cross-sectional area of the grinding section, so that the cross-sectional area of the first spiral rib and the actual situation of its corresponding area are adapted to each other, therefore the operations such as feeding, cutting, squeezing, and grinding can be better completed, and the processing effect of the screw on food materials and the juice yield can be improved.

In one embodiment, the cross-sectional area of the first spiral rib from the cutting section to the grinding section is gradually reduced, and may gradually be reduced, so that enables a smooth transition of the first spiral rib between the feeding area, the squeezing area and the grinding area, therefore the food materials can be gradually crushed, that is, this can sequentially increase the squeeze force of the screw on the food materials. Of course, in other solutions, the cross-sectional area of the first spiral rib may also decrease in steps from top to bottom.

In any of the above-mentioned embodiments, a width of the first spiral rib in a radial direction of the screw body decreases from a side close to the screw body to a side farther from the screw body.

In the embodiment, a width of the first spiral rib in a radial direction of the screw body decreases from a side close to the screw body to a side farther from the screw body, and may be gradually reduced, that is, the width of the first spiral rib is gradually reduced from the outside to the inside, so that the end of the first spiral rib can be set to be sharper, so that the outer side of the first spiral rib contacts the food materials first when the food is cut, therefore it can be quickly inserted into the food materials to perform a certain cutting of the food materials, which can improve the processing effect of the first spiral rib on the food materials.

In any of the above-mentioned embodiments, the first spiral rib has a trapezoidal or triangular cross section.

In the embodiment, the first spiral rib has a trapezoidal or triangular cross section. Because trapezoids or triangles are more common and simple in shape, they are easier to process, which can reduce processing costs. Of course, the cross-sectional area of the first spiral rib may also be other shapes.

In any of the above-mentioned embodiments, the crushing section and the grinding section are stepwise connected at the junction of the squeezing area and the grinding area. This setting can make the processing effect of the first spiral rib on food materials better.

In any of the above-mentioned embodiments, the screw body further comprises at least one discharge rib disposed on a side wall of the screw body at intervals along a circumferential direction of the screw body, and extending to a direction from the bottom surface of the screw body to the top surface of the screw body, and the grinding section is connected to one of the discharge ribs.

In the embodiment, an additional discharge area can be set under the grinding area of the screw body. For example, when the screw is used in a single-cup food processor, the discharge area can be used to discharge residue, when the screw is used in a dual-cup dual-screw food processor, the discharge area can be used to discharge the food materials squeezed and crushed by the screw into another cup, so that the food materials can achieve the separation of juice from residue in another cup. By setting the discharge rib, the discharge rib can be used to push the food materials around the bottom of the screw body, such as the food residue or squeezed and crushed food materials, through the discharge rib to the outlet, such as at the residue outlet or the communication port with another cup, this can realize the discharge of the food residue and the like.

In any of the above-mentioned embodiments, the screw body further comprises at least one second spiral rib disposed on the squeezing area of the screw body; and at least one third spiral rib disposed on the grinding area of the screw body.

In the embodiment, by setting the second spiral rib, the squeezing strength of the screw squeezing area can be increased, so that the food materials can be squeezed more crushed. By setting the third spiral rib, the grinding strength of the screw grinding area can be increased to fully realize the fine-grinding of the food materials.

In any of the above-mentioned embodiments, the screw further comprises an anti-seize rib which is disposed on the squeezing area and located between the cutting section and the second spiral rib.

In the embodiment, when the first spiral rib and the second spiral rib are respectively spirally set, in order to prevent the gap between the first spiral rib and the second spiral rib from becoming too large, an additional anti-seize rib can also be set in the gap between the first spiral rib and the second spiral rib to reduce the gap between the first spiral rib and the second spiral rib, so that the large pieces of the food materials cannot be directly stuck between the first spiral rib and the second spiral rib, this can prevent the food materials from getting stuck to improve the smoothness of the flow of the food materials.

In any of the above-mentioned embodiments, the cross-sectional area of the crushing section is less than or equal to the cross-sectional area of the second spiral rib; and/or the cross-sectional area of the grinding section is less than or equal to the cross-sectional area of the third spiral rib; and/or the number of the third spiral ribs is greater than or equal to 3.

In the embodiment, the cross-sectional area of the crushing section may be equal to the cross-sectional area of the second spiral rib, so that the cross-sectional area of the spiral rib of the squeezing area can be the same, and the cross-sectional area of the grinding section also may be equal to the cross-sectional area of the third spiral rib, so that the cross-sectional area of the spiral rib of the grinding area is the same. This setting can make the structure of the screw body more reasonable, which can improve its processing effect on the food materials, to increase the processing intensity on the food materials.

In one embodiment, the number of the third spiral ribs is greater than or equal to 3. Of course, the number of the third spiral ribs can also be one or two, but may be three, because this makes the number of the third spiral ribs more moderate, which can ensure the grinding effect of the grinding area and prevent the situation that the screw is difficult to process or the cost is high due to the excessive number of the third spiral ribs.

In any of the above-mentioned embodiments, the second spiral rib and the third spiral rib are stepwise connected at the junction of the squeezing area and the grinding area. This setting can further improve the processing effect of the screw on food materials to improve the juice yield.

In any of the above-mentioned embodiments, the screw further comprises a screw shaft, the screw body is sleeved on the screw shaft, and a top surface of the screw shaft protrudes from the top surface of the screw body.

In the embodiment, the screw shaft is used to cooperate with driving of the driving device, such as a motor, etc., so that the screw can be rotated under the driving of the driving device. The top surface of the screw shaft extends from the top surface of the screw body, and the upper end of the screw shaft can be positioned using the protruding part of the screw shaft, so that the screw can be prevented from shaking during the rotation.

In any of the above-mentioned embodiments, the cross-sectional area of the screw body increases from the top surface of the screw body to the bottom surface of the screw body.

In the embodiment, the cross-sectional area of the screw body increases from the top surface of the screw body to the bottom surface of the screw body, gradually increases, so that the channel between the screw and the food processing cup can be made smaller and smaller, therefore the food materials can be processed more and more broken from top to bottom, and the processing power of the screw on the food can be improved. In one embodiment, for example, the screw body has a substantially tapered shape, and the taper of the tapered shape may be in the range of 3° to 15°, and further may be 5°.

In any of the above-mentioned embodiments, the upper surface of the crushing section and the upper surface of the grinding section are downwardly concave arc, that is, the upper surface of the crushing section and the upper surface of the grinding section are not flat but concave surface, so that the food materials cut in the cutting section can fall on the upper wall of the concave portion, and the concave surface drives enough food materials to rotate toward the spiral rib of the crushing area, so that the food materials cut by the cutting rib can be prevented from falling.

In one embodiment, the screw is a large-caliber screw, that is, the screw is longer than the screw of the general food processor, the upper part of this screw can cooperate with the feeding cup, to achieve auxiliary feeding.

According to one embodiment of the present disclosure, the present disclosure provides a food processing cup assembly comprising the screw provided by any of the embodiments, therefore the food processing cup assembly provided by the embodiment of the present disclosure has all the beneficial effects of the screw provided by any of the embodiments, which are not listed here one by one.

In any of the above-mentioned embodiments, the food processing cup assembly further comprises a strainer which is installed in the food processing cup and located between the food processing cup and the screw.

In the embodiment, the food processing cup assembly comprises a strainer which is installed in the food processing cup, so that the crushing area of the screw cooperates with the strainer to squeeze food, and at the same time, the juice in the food materials can be discharged through the strainer, and the residue is kept in the strainer, and the juice is separated from residue.

In any of the above-mentioned embodiments, the height of a bottom of the cutting surface is lower than the height of a top of the strainer or flush with a top of the strainer.

In the embodiment, the height of the bottom of the cutting surface is lower than the height of a top of the strainer or flush with a top of the strainer, ensuring that, when the cutting surface is supporting the food materials to rotate, it can be contacted with the strainer to crush and squeeze the food materials, to prevent the cutting surface from supporting the food materials to idle above the strainer and the food materials cannot be crushed.

According to one embodiment of the present disclosure, the present disclosure provides a food processor comprising the screw provided by any of the embodiments or a food processing cup assembly provided by any of the embodiments, therefore the food processor provided by the embodiment of the present disclosure has all the beneficial effects of the screw provided by any of the embodiments or the food processing cup assembly provided by any of the embodiments, which are not listed here one by one.

In any of the above-mentioned embodiments, the food processor further comprises a feeding cup, a bottom of the feeding cup is provided with a guide surface inclined toward a center direction of the screw, a bottom end of the guide surface is connected to an upper end surface of the strainer, and an inner wall of the guide surface is correspondingly connected to an inner wall of the strainer.

In the embodiment, by setting a guide surface at the bottom of the feeding cup, it can provide motion guidance and bevel buffering for the food materials entering the feeding channel, so that the food materials can smoothly and gently enter the food materials processing cup assembly without hindrance, the guide surface is inclined toward the center of the screw, so that the food materials can move directly to the center of the screw, further, the bottom end of the guide surface is connected to the upper end of the strainer, and the inner wall of the guide surface is correspondingly connected to the inner wall of the strainer, so that the guide surface and the strainer are smoothly connected, the food materials enters between the screw and the strainer through the feeding cup, to facilitate the cooperation between the screw and the strainer to crush the food materials until the juice is produced and the residue is left in the strainer.

In any of the above-mentioned embodiments, the food processor further comprises a dosing cup which is flipped and disposed inside the feeding cup, the dosing cup comprises a first feeding port and a second feeding port, and the opening size of the first feeding port is larger than the opening size of the second feeding port, so that both an upper port and a lower port of the dosing cup can be rotated to face an inner side of the feeding cup.

In the embodiment, the dosing cup comprises a first feeding port and a second feeding port; the dosing cup can be flipped and disposed inside the feeding cup, the positions of the first feeding port and the second feeding port can be interchanged by flipping the dosing cup, when putting a small volume of the food materials through the dosing cup, the user can place the first feeding port on the upper side of the second feeding port, and directly place the food materials in the dosing cup through the first feeding port, the food materials enters the feeding cup through the second feeding port under the action of gravity or user-assisted pushing, and the caliber of the first feeding port is small, so that the user can be prevented from putting hands into the feeding cup, which improves the safety of the food processor; when the volume of the food materials that the user puts into the dosing cup is too large to enter the feeding cup through the second feeding port, the user can put the large volume of the food materials into the dosing cup through the first feeding port, and then flip the dosing cup to make the first feeding port locate on the lower side of the second feeding port, so that the food materials enters the feeding cup through the first feeding port under the action of gravity or user-assisted pushing, at the same time, the user can be prevented from putting hands into the feeding cup, which improves the safety of the food processor. Therefore, when the food materials to be processed for user are too large and it is not convenient to pre-process and separate into small pieces, the food materials to be processed can be easily put into the feeding cup.

An embodiment of the present disclosure provides a food processor, comprising a host assembly provided with a driving device; a food processing cup that can be disposed on the host assembly; and the screw according to any of the embodiments, and the screw is rotatably disposed in the food processing cup and can cooperate with the driving device to rotate under the action of the driving device.

A food processor provided according to an embodiment of the present disclosure comprises a host assembly, a food processing cup, and a screw disposed within the food processing cup, and the host assembly is used for supporting the food processing cup and providing power to the screw, to drive the screw to rotate. The food processing cup mainly cooperates with screw to achieve the crushing of the food materials and the separation of juice from residue. At the same time, the food processor provided by the embodiment of the present disclosure comprises the screw provided by any of the embodiments; therefore the food processor provided by the embodiment has all the beneficial effects of the screw provided by any of embodiments, which are not listed here one by one.

In any of the above-mentioned embodiments, the food processor comprises a strainer installed in the food processing cup and located between the food processing cup and the screw.

In the embodiment, the food processor also comprises a strainer installed in the food processing cup and used for cooperating with the screw to separate the juice from residue of the squeezed food materials.

In any of the above-mentioned embodiments, the food processor further comprises a feeding cup that can be covered and installed on the food processing cup for feeding, and, the feeding cup is provided with a matching surface corresponding to the cutting surface, and the matching surface can be used for cutting and squeezing the food materials together with the cutting surface. Of course, the matching surface can also be matched with the starting end of the first spiral rib to perform preliminary cutting processing on the food materials.

In any of the above-mentioned embodiments, the food processor further comprises a dosing cup rotatably installed in an inlet end of the feeding cup for feeding the food materials into the feeding cup.

In one embodiment, the food processor is a dual-cup dual-screw food processor, that is, the food processor with two cups for crushing and squeezing the food materials and separating the juice from residue of the food materials. Of course, the food processor may also be a single-screw single-cup food processor, that is, the food processor with one cup for crushing and squeezing the food materials and separating the juice from residue of the food materials. At this time, a strainer can be set in the cup body to achieve the separation of the juice from residue of the food materials.

In any of the above-mentioned embodiments, the food processor is a liquidizer or a juicer; of course, the food processor can also be a product other than the liquidizer and the juicer.

Additional embodiments of the present disclosure will be given in the following description, a part of which will become apparent in the following description, or are understood by the practice of the present disclosure.

BRIEF DESCRIPTION OF THE DRAWINGS

The additional embodiments of the present disclosure will become apparent in the description which follows.

In one embodiment, the corresponding relationships between the reference signs and component names in FIGS. 1-10 are as follows:

100 screw, 1 screw body, 12 feeding area, 122 cutting surface, 124 transition surface, 14 squeezing area, 16 grinding area, 18 crushing area, 2 first spiral rib, 22 cutting section, 24 crushing section, 26 grinding section, 3 second spiral rib, 4 third spiral rib, 5 anti-seize rib, 6 discharge rib, 7 screw shaft, 200 food processing cup, 300 strainer, 400 feeding cup, 402 guide surface, 500 dosing cup, 502 first feeding port, 504 second feeding port.

DETAILED DESCRIPTION OF THE DISCLOSURE

In order that the above-mentioned objectives, features and advantages of the present disclosure can be understood more clearly, a further detailed description of the present disclosure will be given below in connection with the accompanying drawings and specific embodiments. It should be noted that the embodiments of the present disclosure and the features in the embodiments can be combined with each other if there is no conflict.

In the following description, numerous specific details are set forth in order to provide a thorough understanding of the present disclosure. However, the present disclosure can also be implemented in other manners than those described herein. Therefore, the protection scope of the present disclosure is not limited to the specific embodiments disclosed below.

The following describes a screw, a food processing cup assembly, and a food processor according to some embodiments of the present disclosure with reference to FIGS. 1-10.

Figure 1:
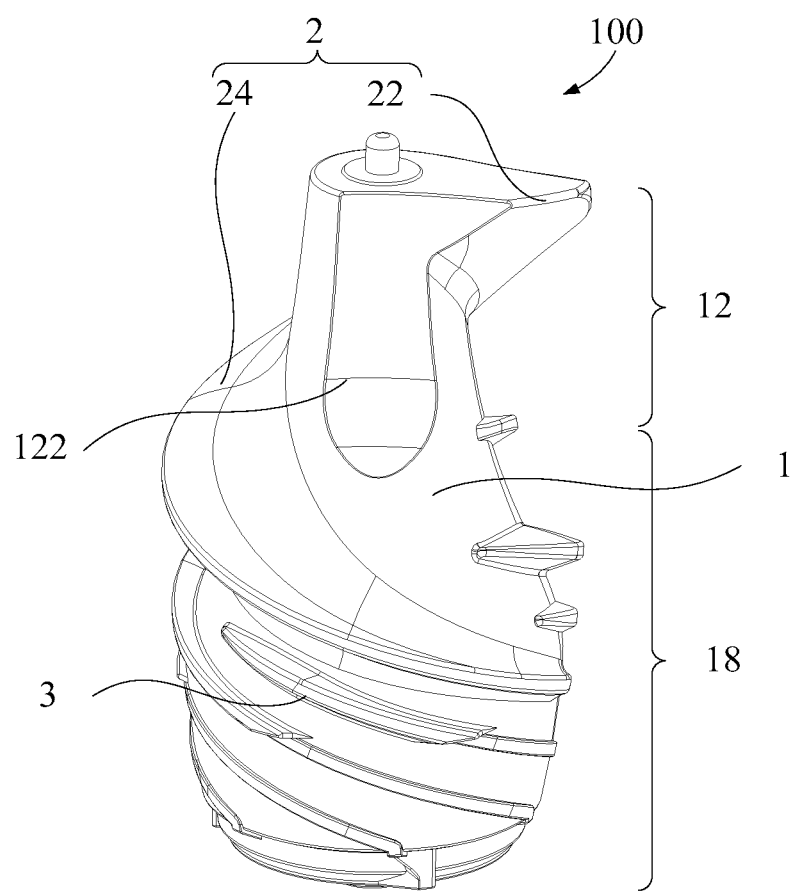
FIG. 1 shows a schematic diagram of a screw provided by an embodiment of the present disclosure.
Figure 2:
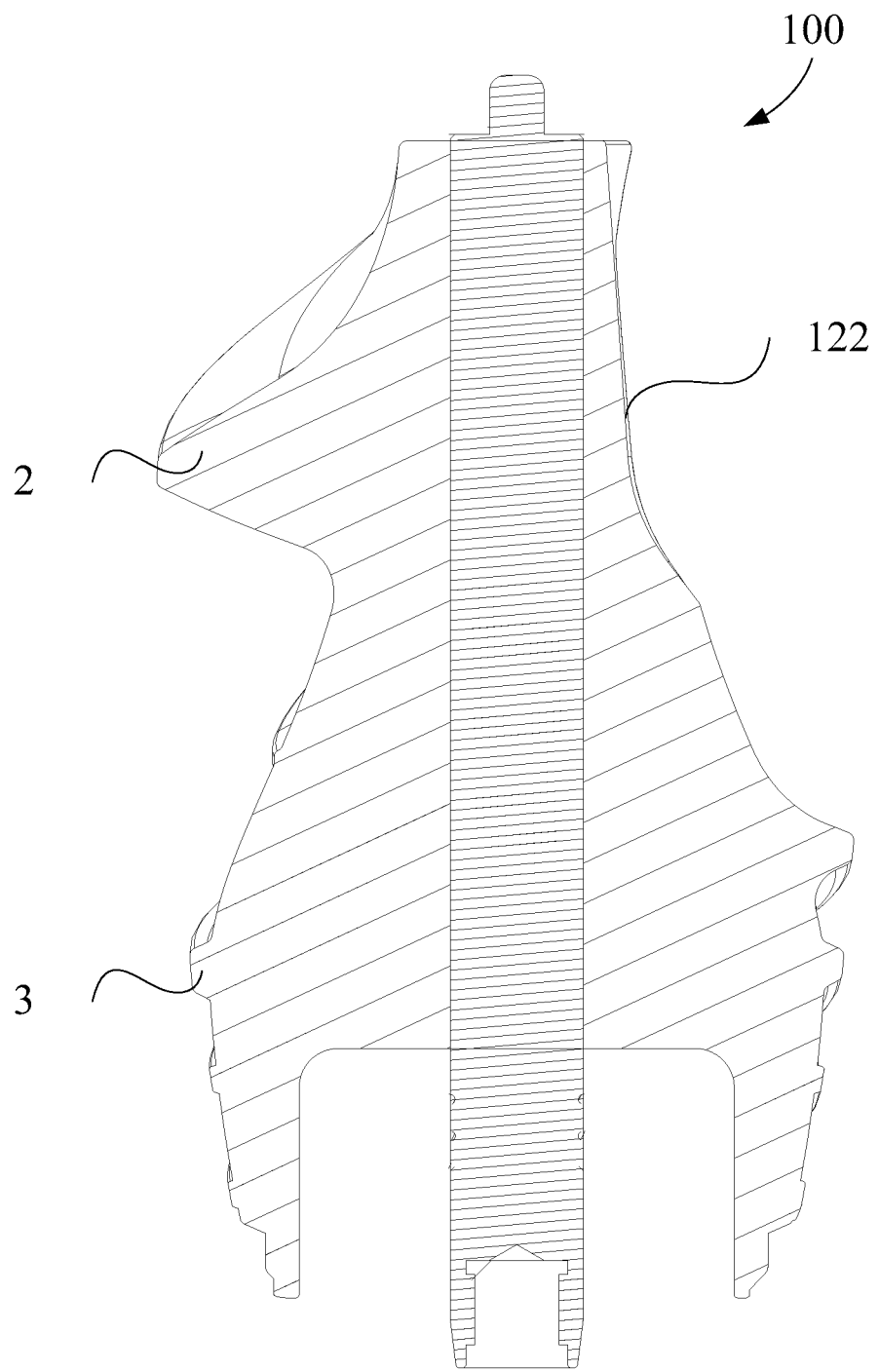
FIG. 2 shows another schematic diagram of a screw provided by an embodiment of the present disclosure.

As shown in FIGS. 1 and 2, the present disclosure provides a screw 100, comprising a screw body 1 including a feeding area 12 for feeding and a crushing area 18 connected to the feeding area 12; a first spiral rib 2 extending along a top of the screw body 1 to a bottom of the screw body 1, the first spiral rib 2 includes a cutting section 22 and a crushing section 24, the cutting section 22 is extended to a direction from the top of the screw body 1 close to the bottom of the screw body 1, one end of the crushing section 24 is connected to the cutting section 22, and the other end of the crushing section 24 is extended to the bottom of the screw body 1; a cutting surface 122 disposed on the feeding area 12, and extending downward from the top of the screw body 1; and second spiral ribs 3 disposed on the screw body 1 at intervals along the axial direction of the screw body 1.

The screw 100 provided by the present disclosure comprises a screw body 1, a first spiral rib 2, a cutting surface 122, and second spiral ribs 3. The screw body 1 is divided into an upper feeding area 12 and a crushing area 18 below the feeding area 12, and the feeding area 12 cooperates with the feeding port of the food processor, that is, the food materials to be crushed may reach the feeding area 12 of the screw body 1 from the feeding port, and is then crushed in the spiral crushing area 18 and discharged from the crushing area 18. The first spiral rib 2 extends along the top of the screw body 1 to the bottom of the screw body 1. The first spiral rib 2 comprises the cutting section 22 and the crushing section 24. The cutting section 22 extends to a direction from the top of the screw body 1 close to the bottom of the screw body 1, one end of the crushing section 24 is connected to the cutting section 22, and the other end of the crushing section 24 extends to the bottom of the screw body 1; the cutting surface 122 is disposed on the feeding area 12 and extends downward from the top of the screw body 1. When the screw body 1 is rotated, the food materials is not raised by the outer wall of the screw body 1 and cannot easily enter the feeding area 12 and the crushing area 18, the cutting surface 122 provides support for the food materials entering through the feeding port of the food processor, to make the food materials move with the screw body 1. At the same time, the cutting surface 122 can ensure that the contact area between the food materials and the screw 100 is increased, to increase the friction between the food materials and the screw 100, and ensuring that the food materials can be fed from the feeding area 12 to the crushing area 18 during rotation; the cutting section 22 of the first spiral rib 2 can cut the food materials supported by the cutting surface 122 before entering the crushing area 18, so that larger pieces of food materials can be cut into smaller volumes by the cutting section 22, which is convenient for improving the crushing efficiency when crushing in the subsequent crushing section 24. By setting the first spiral rib 2 and the cutting surface 122, when the food materials has just entered the feeding area 12, it can be supported by the cutting surface 122 and cut through the cutting section 22, which effectively prevents the occurrence of food materials slipping, reduces the auxiliary squeeze of pushing rod, and improves the convenience of operation. In one embodiment, the cutting surface 122 is concave, which can provide a larger supporting area for food and is more conducive to food collection, and improves the cutting efficiency of food materials.

In an embodiment provided by the present disclosure, a starting end of the first spiral rib 2 is at least partially disposed on the cutting surface 122, so that the first spiral rib 2 partially overlaps the cutting surface 122, and the overlapping portion of the first spiral rib 2 is removed by the cutting surface 122.

In the embodiment, in order to enable the food materials supported by the cutting surface 122 to be directly cut by the first spiral rib 2 and reduce the time of rotation on the screw 100, the cutting surface 122 is set to partially overlap the first spiral rib 2 and the overlapping portion of the first spiral rib 2 is removed by the cutting surface 122, that is, the overlapping portion is set as a part of the cutting surface 122, which ensures that the food materials supported by the cutting surface 122 during rotation does not need to pass through other areas and directly enters the first spiral rib 2 for cutting, and ensures the coherence and efficiency of the internal movement of the screw 100, and improved the cutting efficiency of the first spiral rib 2.

In an embodiment provided by the present disclosure, on a longitudinal section formed by the first spiral rib 2 passing through a centerline of the screw body 1, a width of the first spiral rib 2 decreases outward from the screw body 1.

In the embodiment, on a longitudinal section formed by the first spiral rib 2 passing through a centerline of the screw body 1, a width of the first spiral rib 2 decreases outward from the screw body 1, that is, the first spiral rib 2 is set to increase in thickness from the blade edge to the blade root in order. This setting can ensure that, when cutting large pieces of the food materials, the blade edge first contacts the food materials, and the thinner blade edge can be quickly inserted into the interior of the food materials, and as the screw body 1 drives the first spiral rib 2 to rotate, the first spiral rib 2 is inserted deeper and deeper into the food materials, after the thicker blade root is inserted into the interior of the food materials, it has a greater cutting force to cut the food materials, so that the cutting effect of the first spiral rib 2 is improved.

In an embodiment provided by the present disclosure, the area of each of the longitudinal sections of the crushing section 24 passing through the centerline of the screw body 1 from top to bottom is reduced.

In the embodiment, the area of the longitudinal section of the cutting section 22 in the centerline of the screw body 1 gradually increases until the blade edge of the first spiral rib 2 extends downward to leave the top surface of the screw body 1, and the blade edge of the crushing section 24 is started to set from the position where it is turned away from the top surface of the screw body 1, and in order to ensure that the feeding area 12 enters the crushing area 18 enough, it is necessary to set the thickness of the crushing section 24 to gradually decrease, ensuring that a larger area is set on the surface of the screw body 1 to transport the food materials.

In an embodiment provided by the present disclosure, on the longitudinal section formed by the crushing section 24 passing through the centerline of the screw body 1, an upper side wall of the crushing section 24 is a downwardly concave arc.

In the embodiment, on the longitudinal section formed by the crushing section 24 passing through the centerline of the screw body 1, an upper side wall of the crushing section 24 is a downwardly concave arc, that is, the upper wall of the crushing section 24 is not a flat surface but an inner concave, so that the food materials cut by the first spiral rib 2 can fall on the upper wall of the recess, and through the concave surface, enough food materials are driven to rotate to the second spiral rib 3 of the crushing area 18 to prevent the food materials cut by the first spiral rib 2 dropping.

In an embodiment provided by the present disclosure, a cross-sectional area of the screw body 1 increases from the feeding area 12 to the crushing area 18.

In the embodiment, a cross-sectional area of the screw body 1 increases from the feeding area 12 to the crushing area 18, that is, the screw body 1 has a substantially tapered shape, and the taper of the tapered shape may be in the range of 3° to 15°, further may be 5°, this kind of setting can twist and crush food when using the screw 100 for food processor to crush food, so it can improve the food crushing effect of food processor to improve the juice yield.

In an embodiment provided by the present disclosure, on the longitudinal section passing through the centerline of the screw body 1, the vertical distance from a blade edge of the first spiral rib 2 to the centerline of the screw body 1 is greater than or equal to the vertical distance from a top of the second spiral rib 3 to the centerline of the screw body 1.

In the embodiment, on the longitudinal section passing through the centerline of the screw body 1, the vertical distance from a blade edge of the first spiral rib 2 to the centerline of the screw body 1 is greater than or equal to the vertical distance from a top of the second spiral rib 3 to the centerline of the screw body 1. At the same time, the screw body has a substantially tapered shape, that is, the width of the screw body 1 provided with the first spiral rib 2 portion is smaller than the width of the screw body 1 provided with the second spiral rib 3 portion, which can ensure that the area surrounded by the first spiral rib 2 and the screw body 1 is larger than the area surrounded by the second spiral rib 3 and the screw body 1, so that it is possible to quickly cut more food materials into small pieces when cutting the food materials, and when squeezing and crushing the small pieces of food materials, each time the food is crushed, the space is getting smaller and smaller to ensure a good juice output when the food is crushed.

In an embodiment provided by the present disclosure, the first spiral rib 2 is extended to the crushing area 18 and connected to the second spiral rib 3 on the crushing area 18, the connection between the first spiral rib 2 and the second spiral rib 3 is a smooth transition.

In the embodiment, when the first spiral rib 2 is rotated on the screw body 1, the first spiral rib 2 extends downward to the crushing area 18 and is connected to the second spiral rib 3 on the crushing area 18, so that the small food materials cut by the first spiral rib 2 can be moved along the side wall of the first spiral rib 2 to the second spiral rib 3 directly for squeezing and crushing, and the connection between the first spiral rib 2 and the second spiral rib 3 is a smooth transition to ensure that the food materials will not get stuck at the junction of the first spiral rib 2 and the second spiral rib 3.

In an embodiment provided by the present disclosure, the first spiral rib 2 and the second spiral rib 3 are an integrated structure.

In the embodiment, the first spiral rib 2 and the second spiral rib 3 may be an integrated structure. Because the integrated structure has good mechanical properties, it can improve the connection strength between the first spiral rib 2 and the second spiral rib 3. In addition, the first spiral rib 2 and the second spiral rib 3 can be made into one body and mass-produced to improve the processing efficiency of the product and reduce the processing cost of the product.

As shown in FIGS. 3-7, the present disclosure provides a screw 100 for a food processor, in one embodiment, the screw 100 comprises a screw body 1, a cutting surface 122 is provided on a side of the screw body 1, the cutting surface 122 is extended from a top surface of the screw body 1 to a bottom surface of the screw body 1, and an angle between the cutting surface 122 and the top surface of the screw body 1 is $\alpha$, and $90°<\alpha\leq150°$; and a first spiral rib 2 provided on the side of the screw body 1, and the first spiral rib 2 is extended spirally from the top surface of the screw body 1 to the bottom surface of the screw body 1.

The screw 100 provided according to the present disclosure comprises a screw body 1 and a first spiral rib 2, in one embodiment, a side of the screw body 1 is provided with a cutting surface 122, and the cutting surface 122 is provided downward from the top of the screw body 1, and the first spiral rib 2 is provided at the side of the screw body 1, it also extends downward from the top of the screw body 1. By setting the cutting surface 122 and the angle between the cutting surface 122 and the top surface of the screw body 1 in a range of $90°<\alpha\leq150°$, the cutting surface 122 can be extended downward from the top surface of the screw body 1, that is, the cutting surface 122 can be set from the top to the bottom of the screw body 1, the screw body 1 can be tilted and recessed at the cutting surface 122, so that the upper end of the screw body 1 can be formed into a buckle shape. After the food materials are put into the feeding cup 400, the food materials will be buckled on the cutting surface 122 by the cutting surface 122, that is, the cutting surface 122 can apply a pressure to the food materials to press the food materials so that the food materials will not be lifted by the outer wall of the screw body 1, so that the food materials can be prevented from slipping or retreating during feeding, the food materials can be fixed between the cutting surface 122 and the inner wall surface of the feeding cup 400 during feeding, so that, when the screw 100 rotates, the cutting surface 122 can be used to preliminarily squeeze the food materials together with the sidewall of the feeding cup 400 to achieve the preliminary processing of the food materials. The first spiral rib 2 spirally extends downward from the top of the screw 100, so that the food materials have been initially processed can be further cut and squeezed under the action of the first spiral rib 2, and flow down the first spiral rib 2, so that the feeding operation of food materials can be completed. This kind of setting can set the cutting surface 122 and reasonably set the tilt angle of the cutting surface 122, so that the cutting surface 122 can be used to press the food materials during feeding, therefore it can prevent the food materials from slipping or retreating from cutting normally, thus making food materials can be smoothly cut by the screw 100 and conveyed to the bottom of the screw 100, in this way, when feeding, the auxiliary pushing action of the push rod can be reduced, which can reduce the operation of the user and improve the convenience of juice extraction. By setting the angle $\alpha$ between the cutting surface 122 and the top surface of the screw body 1 in a range of $90°<\alpha\leq150°$, the cutting surface 122 can have a reasonable tilt angle inward, so that the pressing force of the cutting surface 122 on the food materials can be controlled reasonably, therefore the cutting surface 122 can press down the food materials and make the outer surface of the screw body 1 smoother, not to jam the food materials, which can prevent the food materials from slipping and retreating, at the same time, the food materials can flow down smoothly.

In one embodiment, the angle $\alpha$ between the cutting surface 122 and the top surface of the screw body 1 is greater than or equal to 95° and less than or equal to 150°, such as $\alpha$ is 100°, or $\alpha$ is 120°, or $\alpha$ is 130°.

In one embodiment, it is explained here that the angle $\alpha$ between the cutting surface 122 and the top surface of the screw body 1 is the angle between the two planes when the cutting surface 122 is a plane, but when the cutting surface 122 is an arc-shaped surface, the angle $\alpha$ between the cutting surface 122 and the top surface of the screw body 1 is the angle between the surface of each cross section of the cutting surface 122 and the top surface of the screw body 1.

Figure 3:
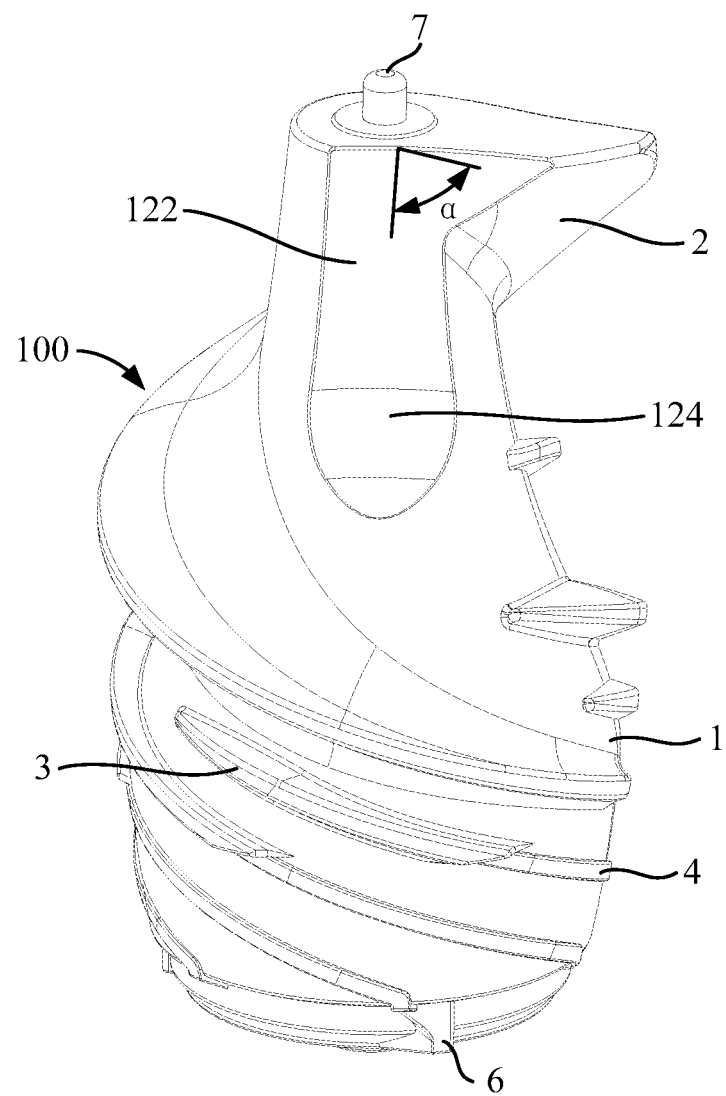
FIG. 3 shows another schematic diagram of a screw provided by an embodiment of the present disclosure.

In an embodiment provided by the present disclosure, as shown in FIG. 3, a top of the first spiral rib 2 is connected to one side of the cutting surface 122, or a top surface of the cutting surface 122 partially extends to the first spiral rib 2.

In the embodiment, the top of the first spiral rib 2 is connected to one side of the cutting surface 122, that is, the first spiral rib 2 starts from one side of the cutting surface 122 and spirals downward from the top of the screw 100, so that the cutting surface 122 and the first spiral rib 2 can smoothly transition, therefore the food materials that is initially squeezed and cut by the cutting surface 122 can be conveyed down the first spiral rib 2 to smoothly feed the materials, which can reduce the length of time that the food materials rotates on the screw 100 and make the food materials directly enter the first spiral rib 2 without going through other areas, to ensure the continuity and efficiency of the internal action of the screw 100, and improving the cutting efficiency of the cutting rib. Further, the top surface of the cutting surface 122 partially extends to the first spiral rib 2, that is, the starting end of the first spiral rib 2 is at least partially set on the cutting surface 122, so that the starting end of the first spiral rib 2 partially overlaps the cutting surface 122, and the overlapping portion of the cutting section 22 is removed by the cutting surface 122. This ensures that the food materials directly enters the first spiral rib 2 without going through other areas during rotation and ensures the continuity and efficiency of the internal action of the screw 100 and improves the cutting efficiency of the first spiral rib 2.

In an embodiment provided by the present disclosure, as shown in FIG. 3, the screw body 1 is further provided with a transition surface 124, one end of the transition surface 124 is smoothly connected to one end of the cutting surface 122 close to the bottom surface of the screw body 1, and the other end of the transition surface 124 extends toward the bottom surface direction of the screw body 1.

In the embodiment, by setting the transition surface 124, it can make a smooth transition connection between the cutting surface 122 and the rest of the screw 100 outer surface, and can prevent the screw body 1 from forming a dead angle at the lower end of the cutting surface 122 to jam the food materials, so that the food materials can flow down smoothly.

In an embodiment provided by the present disclosure, as shown in FIG. 3, the transition surface 124 is an arc-shaped surface, and/or the cutting surface 122 is an arc-shaped surface.

In the embodiment, by setting the transition surface 124 and the cutting surface 122 to be arc-shaped surfaces, the transition surface 124 and the cutting surface 122 can be made smoother, so that the transition surface 124 and the cutting surface 122 can be prevented from appearing dead angles and can make the food materials flow more smoothly and improve the flow of food materials and the product efficiency.

Figure 4:
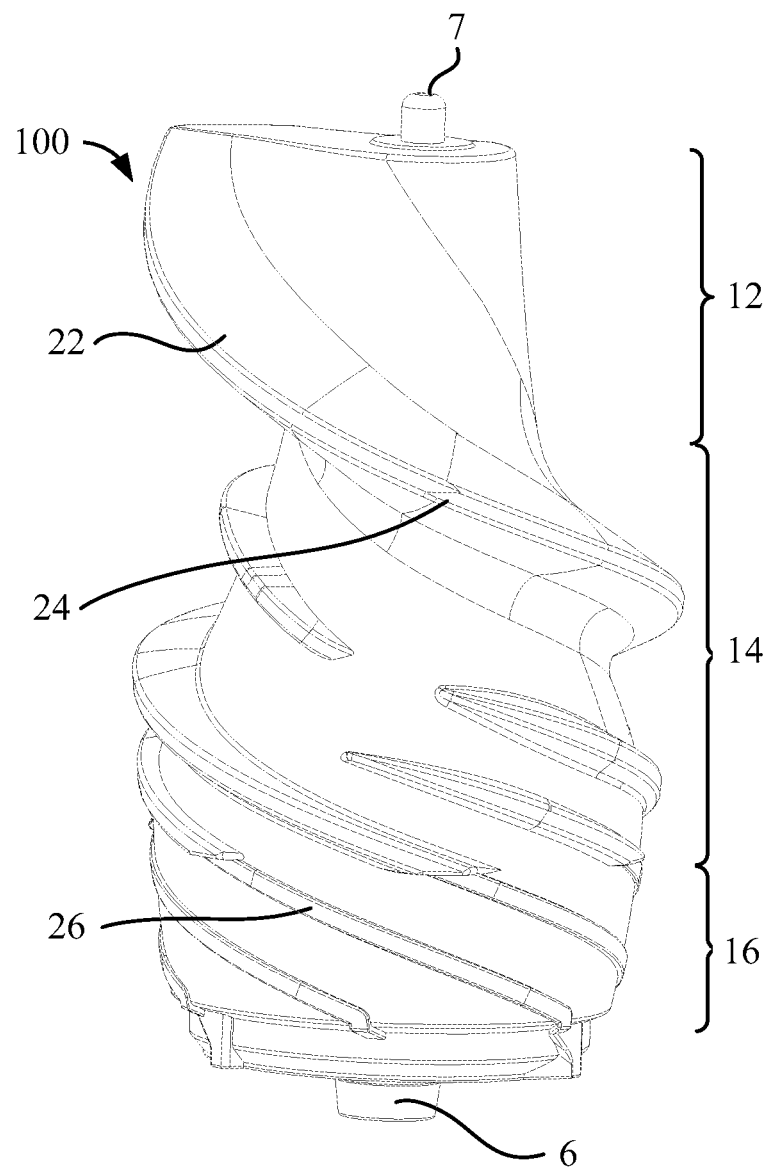
FIG. 4 shows another schematic diagram of a screw provided by an embodiment of the present disclosure.
Figure 5:
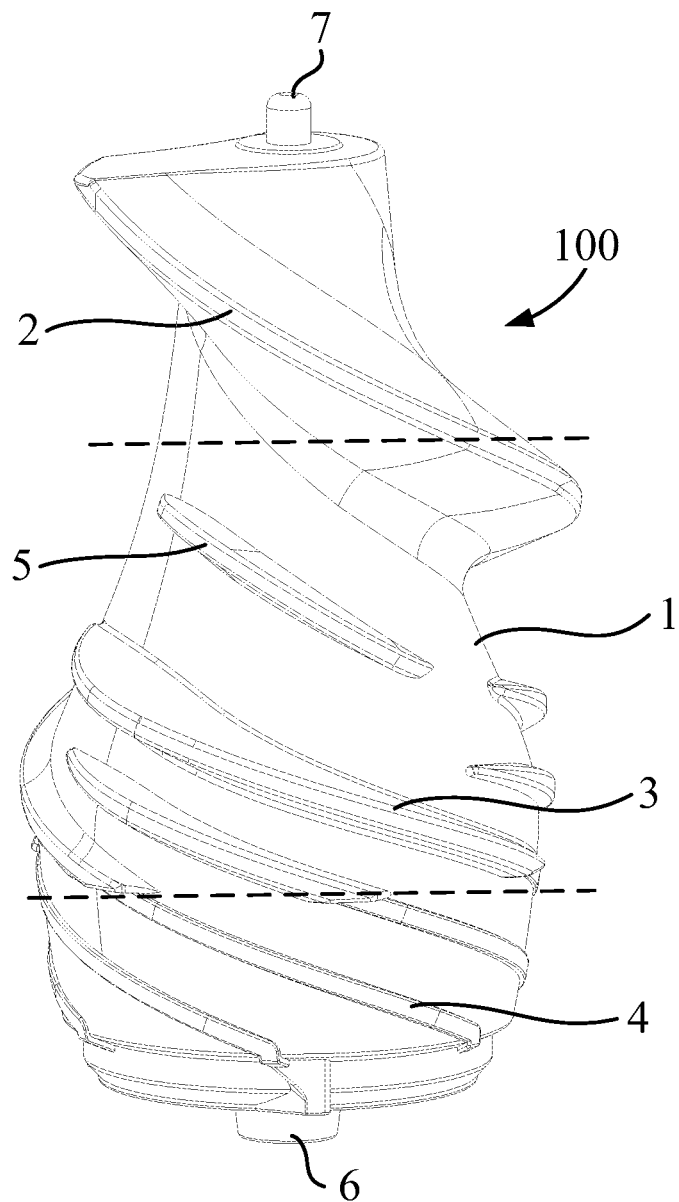
FIG. 5 shows another schematic diagram of a screw provided by an embodiment of the present disclosure.

In an embodiment provided by the present disclosure, as shown in FIGS. 4 and 5, the screw body 1 comprises a feeding area 12, a squeezing area 14, and a grinding area 16 in order from the top surface of the screw body 1 to the bottom surface of the screw body 1, as shown in FIGS. 2 and 3, the first spiral rib 2 comprises a cutting section 22 correspondingly provided in the feeding area 12, a crushing section 24 correspondingly provided in the squeezing area 14, and a grinding section 26 correspondingly provided in the grinding area 16, and the cutting surface 122 is only provided on the feeding area 12.

In the embodiment, the screw body 1 is divided into three areas from the top to the bottom, namely the feeding area 12, the squeezing area 14 and the grinding area 16, and, the feeding area 12 is mainly used for feeding, and the squeezing area 14 is mainly used for preliminary squeezing of the food materials to squeeze the food materials into smaller pieces, and the grinding area 16 is mainly used for fine-grinding the food materials so that the food materials can be squeezed and cut into smaller pieces. The cutting surface 122 is only set on the feeding area 12 to prevent the food materials from slipping and retreating when feeding. The first spiral rib 2 corresponding to the three areas of the screw body 1 is also divided into three sections, namely the cutting section 22, crushing section 24 and the grinding section 26, and the cutting section 22 is mainly used for preliminary squeezing and cutting of the food materials during feeding to achieve the preliminary processing of the food materials, the crushing section 24 is used for squeezing of the food materials, and the grinding section 26 is mainly used for more fully squeezing the food materials, that is, fine-grinding, so that the food materials can be processed to be more broken.

In one embodiment, since the squeezing area 14 and the grinding area 16 both perform squeezing and crushing process on the food materials, the squeezing area 14 and the grinding area 16 can also be collectively referred to as the squeezing area.

In one embodiment, the dotted line in FIG. 5 indicates the dividing line between the feeding area 12 and the squeezing area 14, and the squeezing area 14 and the grinding area 16.

In an embodiment provided by the present disclosure, as shown in FIGS. 3-5, the cutting section 22, the crushing section 24 and the grinding section 26 are an integrated structure.

In the embodiment, the cutting section 22, the crushing section 24 and the grinding section 26 may be an integrated structure, because the mechanical properties of the integrated structure are good, so the connection strength between the cutting section 22, the crushing section 24 and the grinding section 26 can be improved. In addition, the cutting section 22, the crushing section 24 and the grinding section 26 can be made into one body and mass-produced to improve the processing efficiency of the product and reduce the processing cost of the product.

In an embodiment provided by the present disclosure, as shown in FIGS. 3-5, the cross-sectional area of the cutting section 22 is larger than the cross-sectional area of the crushing section 24, and/or the cross-sectional area of the crushing section 24 is larger than the cross-sectional area of the grinding section 26.

In the embodiment, the cross-sectional area of the cutting section 22 is larger than the cross-sectional area of the crushing section 24, and the cross-sectional area of the crushing section 24 is larger than the cross-sectional area of the grinding section 26, so that the cross-sectional area of the first spiral rib 2 and the actual situation of its corresponding area are adapted to each other, therefore the operations such as feeding, cutting, squeezing, and grinding can be better completed, and the processing effect of the screw 100 on food materials and the juice yield can be improved.

In one embodiment, the cross-sectional area of the first spiral rib 2 from the cutting section 22 to the grinding section 26 is gradually reduced, and may gradually be reduced, so that enables a smooth transition of the first spiral rib 2 between the feeding area 12, the squeezing area 14 and the grinding area 16, therefore the food materials can be gradually crushed, that is, this can sequentially increase the squeeze force of the screw 100 on the food materials. Of course, in other solutions, the cross-sectional area of the first spiral rib 2 may also decrease in steps from top to bottom.

In an embodiment provided by the present disclosure, as shown in FIGS. 3-5, a width of the first spiral rib 2 in a radial direction of the screw body 1 decreases from a side close to the screw body 1 to a side farther from the screw body 1.

In the embodiment, a width of the first spiral rib 2 in a radial direction of the screw body 1 decreases from a side close to the screw body 1 to a side farther from the screw body 1, and may gradually be reduced, that is, the width of the first spiral rib 2 is gradually reduced from the outside to the inside, so that the end of the first spiral rib 2 can be set to be sharper, so that the outer side of the first spiral rib 2 contacts the food materials first when the food is cut, therefore it can be quickly inserted into the food materials to perform a certain cutting of the food materials, which can improve the processing effect of the first spiral rib 2 on the food materials.

Figure 6:
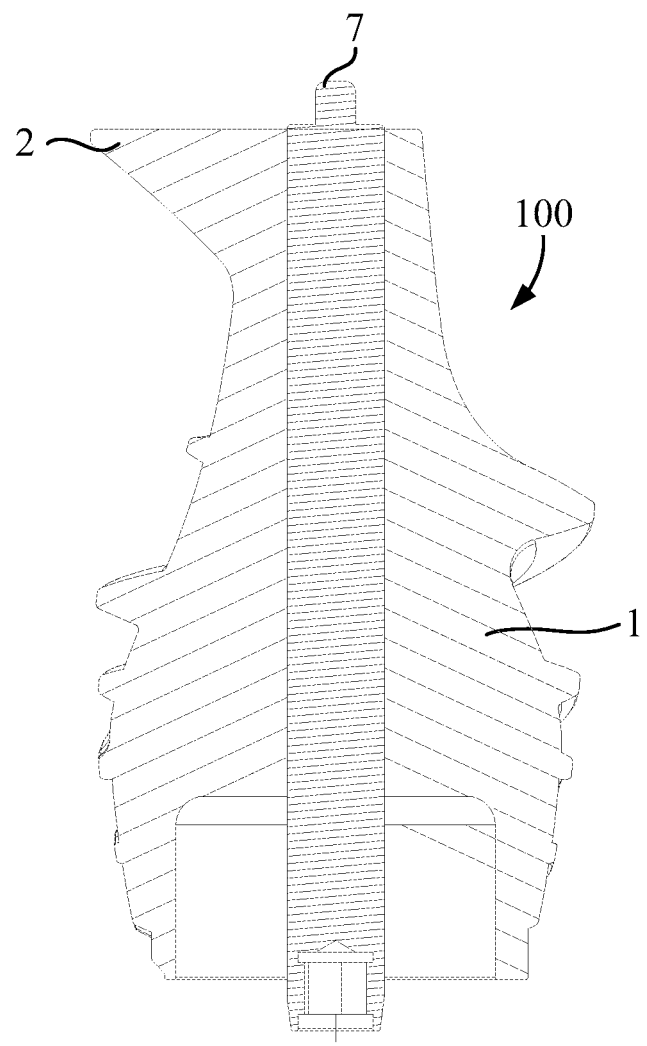
FIG. 6 shows another schematic diagram of a screw provided by an embodiment of the present disclosure.
Figure 7:
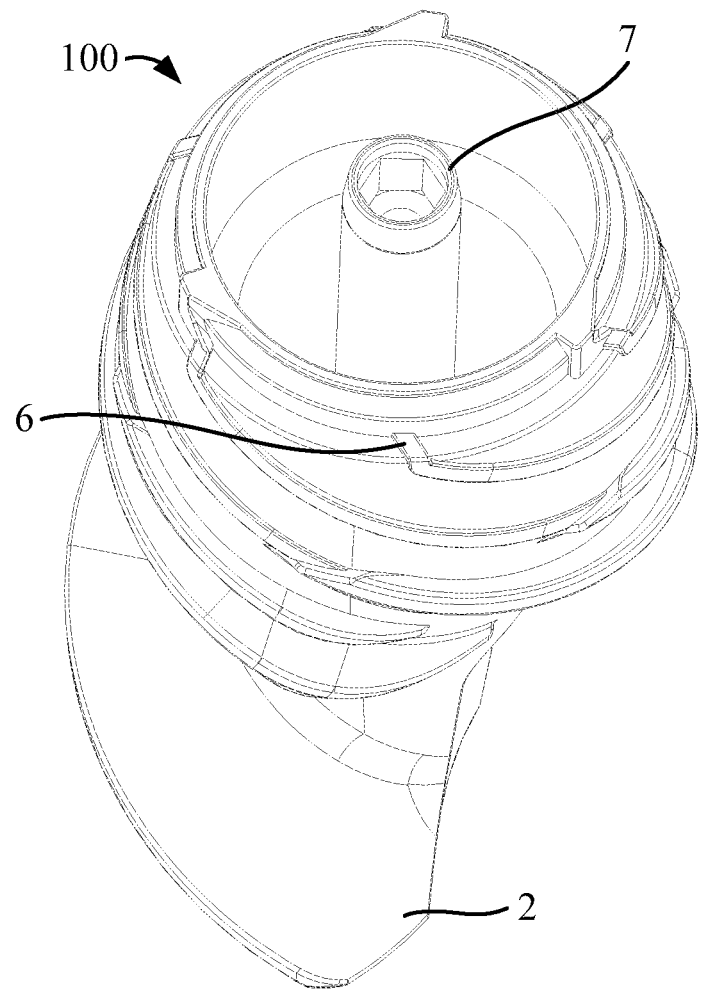
FIG. 7 shows another schematic diagram of a screw provided by an embodiment of the present disclosure.

In an embodiment provided by the present disclosure, as shown in FIGS. 6 and 7, the first spiral rib 2 has a trapezoidal or triangular cross section.

In the embodiment, the first spiral rib 2 has a trapezoidal or triangular cross section. Because trapezoids or triangles are more common and simple in shape, they are easier to process, which can reduce processing costs. Of course, the cross-sectional area of the first spiral rib 2 may also be other shapes.

In an embodiment provided by the present disclosure, as shown in FIGS. 3-5, the crushing section 24 and the grinding section 26 are stepwise connected at the junction of the squeezing area 14 and the grinding area 16. This setting can make the processing effect of the first spiral rib 2 on food materials better.

In an embodiment provided by the present disclosure, as shown in FIGS. 3-5 and 7, the screw body 1 further comprises at least one discharge rib 6 disposed on a side wall of the screw body 1 at intervals along a circumferential direction of the screw body 1, and extending to a direction from the bottom surface of the screw body 1 to the top surface of the screw body 1, and the grinding section 26 is connected to one of the discharge ribs 6.

In the embodiment, an additional discharge area can be set under the grinding area 16 of the screw body 1. For example, when the screw 100 is used in a single-cup food processor, the discharge area can be used to discharge residue, when the screw 100 is used in a dual-cup dual-screw 100 food processor, the discharge area can be used to discharge the food materials squeezed and crushed by the screw 100 into another cup, so that the food materials can achieve the separation of juice from residue in another cup. By setting the discharge rib 6, the discharge rib 6 can be used to push the food materials around the bottom of the screw body 1, such as the food residue or squeezed and crushed food materials, through the discharge rib 6 to the outlet, such as at the residue outlet or the communication port with another cup, this can realize the discharge of the food residue and the like.

In an embodiment provided by the present disclosure, as shown in FIGS. 3-5, the screw body 1 further comprises at least one second spiral rib 3 disposed on the squeezing area 14 of the screw body 1; and at least one third spiral rib 4 disposed on the grinding area 16 of the screw body 1.

In the embodiment, by setting the second spiral rib 3, the squeezing strength of the screw 100 squeezing area 14 can be increased, so that the food materials can be squeezed more crushed. By setting the third spiral rib 4, the grinding strength of the screw 100 grinding area 16 can be increased to fully realize the fine-grinding of the food materials.

In an embodiment provided by the present disclosure, as shown in FIG. 5, the screw 100 further comprises an anti-seize rib 5 which is disposed on the squeezing area 14 and located between the cutting section 22 and the second spiral rib 3.

In the embodiment, when the first spiral rib 2 and the second spiral rib 3 are respectively spirally set, in order to prevent the gap between the first spiral rib 2 and the second spiral rib 3 from becoming too large, an additional anti-seize rib 5 can also be set in the gap between the first spiral rib 2 and the second spiral rib 3 to reduce the gap between the first spiral rib 2 and the second spiral rib 3, so that the large pieces of the food materials cannot be directly stuck between the first spiral rib 2 and the second spiral rib 3, this can prevent the food materials from getting stuck to improve the smoothness of the flow of the food materials.

In an embodiment provided by the present disclosure, as shown in FIGS. 3-5, the cross-sectional area of the crushing section 24 is less than or equal to the cross-sectional area of the second spiral rib 3; and/or the cross-sectional area of the grinding section 26 is less than or equal to the cross-sectional area of the third spiral rib 4; and/or the number of the third spiral ribs 4 is greater than or equal to 3.

In the embodiment, the cross-sectional area of the crushing section 24 may be equal to the cross-sectional area of the second spiral rib 3, so that the cross-sectional area of the spiral rib of the squeezing area 14 can be the same, and the cross-sectional area of the grinding section 26 also may be equal to the cross-sectional area of the third spiral rib 4, so that the cross-sectional area of the spiral rib 3 of the grinding area 16 is the same. This setting can make the structure of the screw body 1 more reasonable, which can improve its processing effect on the food materials, to increase the processing intensity on the food materials.

In one embodiment, the number of the third spiral ribs 4 is greater than or equal to 3. Of course, the number of the third spiral ribs 4 can also be one or two, but it may be three, because this makes the number of the third spiral ribs 4 more moderate, which can ensure the grinding effect of the grinding area 16 and prevent the situation that the screw 100 is difficult to process or the cost is high due to the excessive number of the third spiral ribs 4.

In an embodiment provided by the present disclosure, as shown in FIGS. 3-5, the second spiral rib 3 and the third spiral rib 4 are stepwise connected at the junction of the squeezing area 14 and the grinding area 16. This setting can further improve the processing effect of the screw 100 on food materials to improve the juice yield.

In an embodiment provided by the present disclosure, as shown in FIGS. 3-7, the screw 100 further comprises a screw shaft 7, the screw body 1 is sleeved on the screw shaft 7, and as shown in FIGS. 4-6, a top surface of the screw shaft 7 protrudes from the top surface of the screw body 1.

In the embodiment, the screw shaft 7 is used to cooperate with driving of the driving device, such as a motor, etc., so that the screw 100 can be rotated under the driving of the driving device. The top surface of the screw shaft 7 extends from the top surface of the screw body 1, and the upper end of the screw shaft 7 can be positioned using the protruding part of the screw shaft 7, so that the screw 100 can be prevented from shaking during the rotation.

In an embodiment provided by the present disclosure, as shown in FIGS. 1-6, the cross-sectional area of the screw body 1 increases from the top surface of the screw body 1 to the bottom surface of the screw body 1.

In the embodiment, the cross-sectional area of the screw body 1 increases from the top surface of the screw body 1 to the bottom surface of the screw body 1, gradually increases, so that the channel between the screw 100 and the food processing cup 200 can be made smaller and smaller, therefore the food materials can be processed more and more broken from top to bottom, and the processing power of the screw 100 on the food can be improved. In one embodiment, for example, the screw body 1 has a substantially tapered shape, and the taper of the tapered shape may be in the range of 3° to 15°, and further may be 5°.

In an embodiment provided by the present disclosure, the upper surface of the crushing section 24 and the upper surface of the grinding section 26 are downwardly concave arc, that is, the upper surface of the crushing section 24 and the upper surface of the grinding section 26 are not flat but concave surface, so that the food materials cut in the cutting section 22 can fall on the upper wall of the concave portion, and the concave surface drives enough food materials to rotate toward the spiral rib of the crushing area, so that the food materials cut by the cutting rib can be prevented from falling.

In one embodiment, the screw is a large-caliber screw, that is, the screw is longer than the screw of the general food processor, the upper part of this screw can cooperate with the feeding cup to achieve auxiliary feeding.

Figure 8:
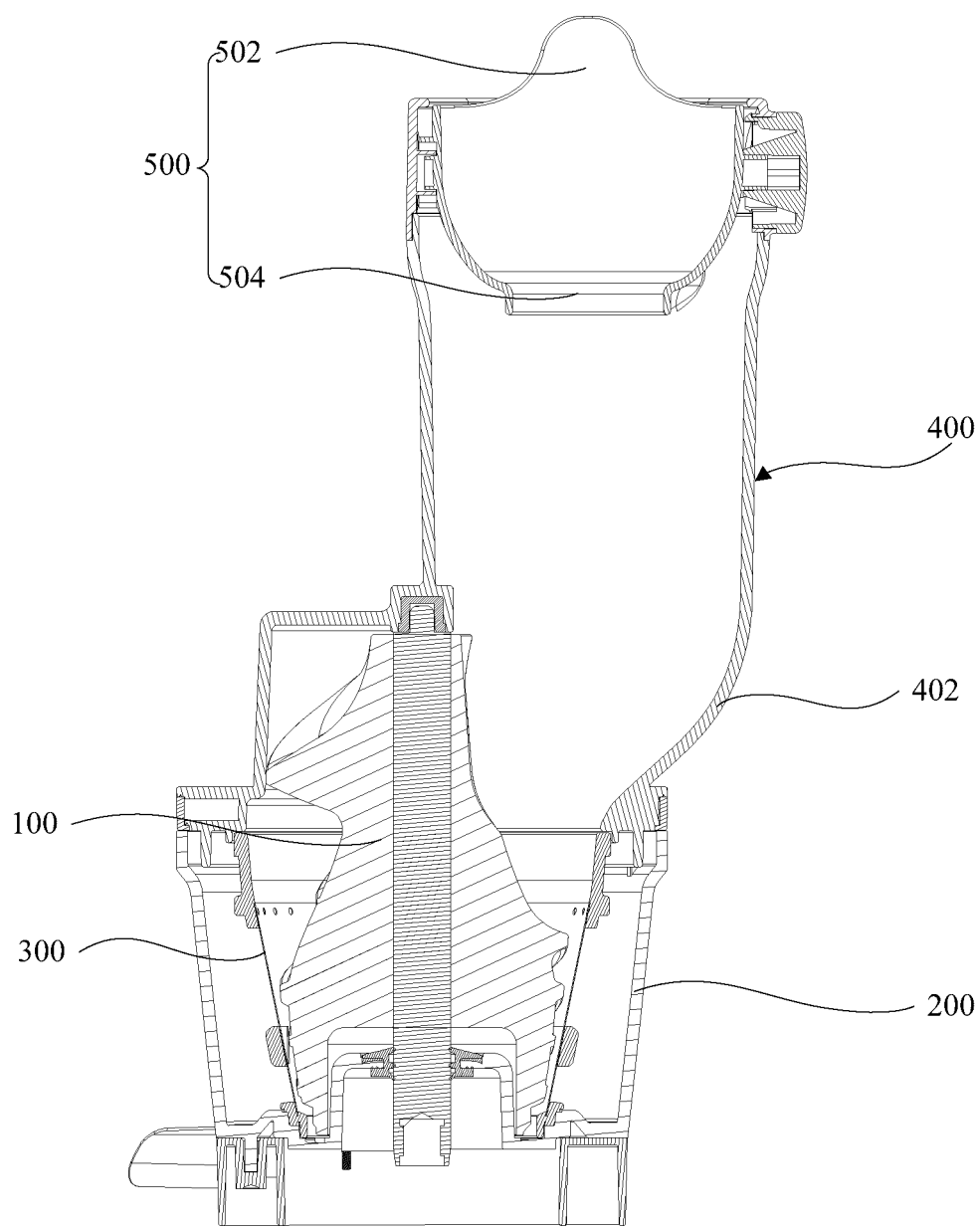
FIG. 8 shows a partial structure schematic diagram of a food processor provided by an embodiment of the present disclosure.
Figure 9:
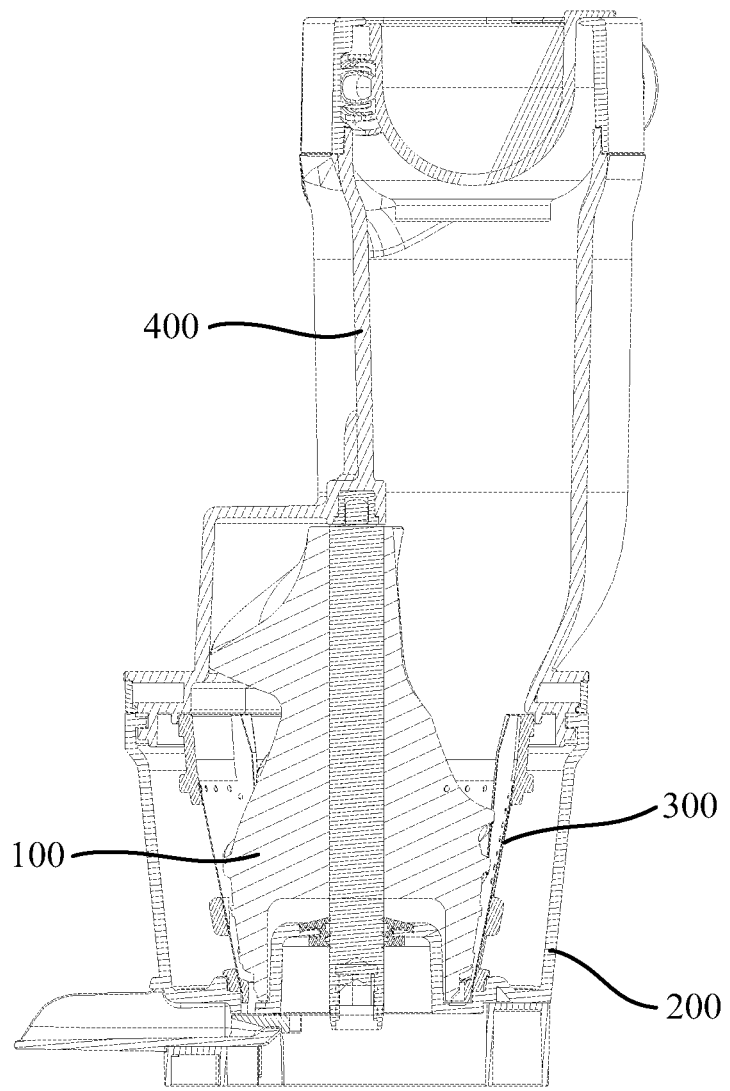
FIG. 9 shows another structure schematic diagram of a food processor provided by an embodiment of the present disclosure.
Figure 10:
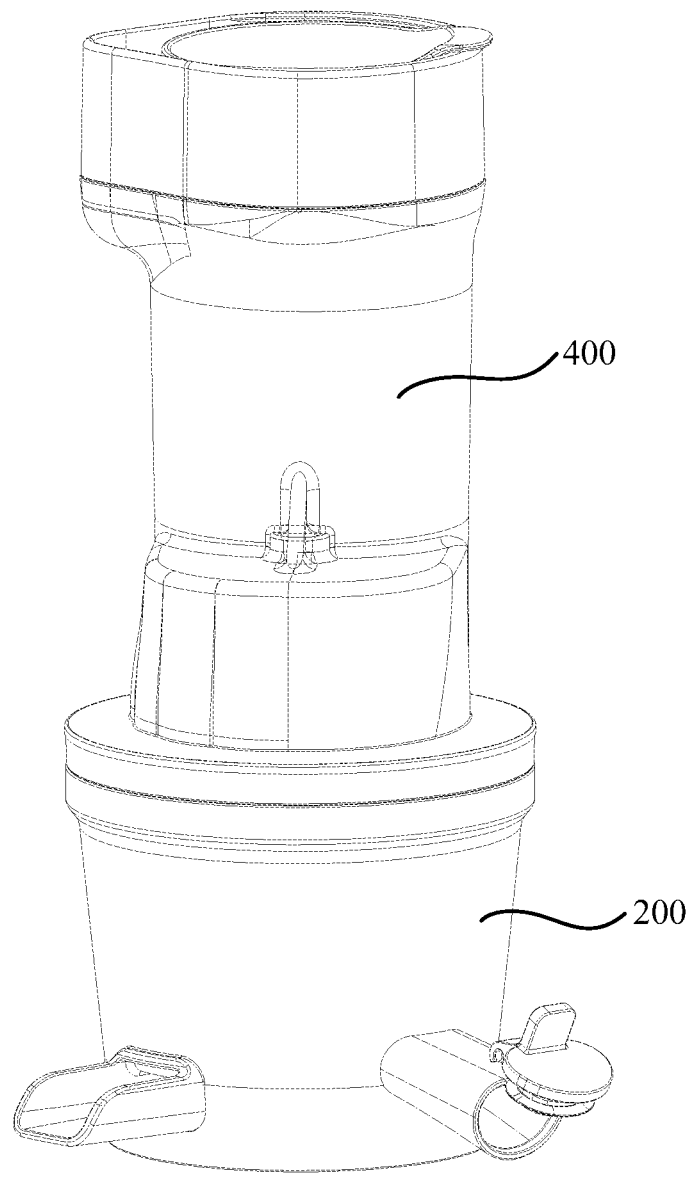
FIG. 10 shows a further structure schematic diagram of a food processor provided by an embodiment of the present disclosure.

As shown in FIGS. 8 to 10, according to the embodiments of the present disclosure, the present disclosure provides a food processing cup assembly comprising the screw 100 provided by any of the embodiments, therefore the food processing cup assembly provided by the embodiment of the present disclosure has all the beneficial effects of the screw 100 provided by any of the embodiments, which are not listed here one by one.

In an embodiment provided by the present disclosure, the food processing cup assembly further comprises a strainer 300 which is installed in the food processing cup 200 and located between the food processing cup 200 and the screw 100.

In the embodiment, the food processing cup assembly comprises a strainer 300 which is installed in the food processing cup 200, so that the crushing area 18 of the screw 100 cooperates with the strainer 300 to squeeze food, and at the same time, the juice in the food materials can be discharged through the strainer 300, and the residue is kept in the strainer 300, and the juice is separated from residue.

In an embodiment provided by the present disclosure, the height of a bottom of the cutting surface 122 is lower than the height of a top of the strainer 300 or flush with a top of the strainer 300.

In the embodiment, the height of the bottom of the cutting surface 122 is lower than the height of a top of the strainer 300 or flush with a top of the strainer 300, ensuring that, when the cutting surface 122 is supporting the food materials to rotate, it can be contacted with the strainer 300 to crush and squeeze the food materials, to prevent the cutting surface 122 from supporting the food materials to idle above the strainer 300 and the food materials cannot be crushed.

According to the embodiments of the present disclosure, the present disclosure provides a food processor comprising the screw 100 provided by any of the embodiments of food processing cup assembly provided by any of the embodiments, therefore the food processor provided by the embodiment of the present disclosure has all the beneficial effects of the screw 100 provided by any of the embodiments of the food processing cup assembly provided by any of the embodiments, which are not listed here one by one.

In an embodiment provided by the present disclosure, the food processor further comprises a feeding cup 400, a bottom of the feeding cup 400 is provided with a guide surface 402 inclined toward a center direction of the screw 100, a bottom end of the guide surface 402 is connected to an upper end surface of the strainer 300, and an inner wall of the guide surface 402 is correspondingly connected to an inner wall of the strainer 300.

In the embodiment, by setting a guide surface 402 at the bottom of the feeding cup 400, it can provide motion guidance and bevel buffering for the food materials entering the feeding channel, so that the food materials can smoothly and gently enter the food materials processing cup assembly without hindrance, the guide surface 402 is inclined toward the center of the screw 100, so that the food materials can move directly to the center of the screw 100, further, the bottom end of the guide surface 402 is connected to the upper end of the strainer 300, and the inner wall of the guide surface 402 is correspondingly connected to the inner wall of the strainer 300, so that the guide surface 402 and the strainer 300 are smoothly connected, the food materials enters between the screw 100 and the strainer 300 through the feeding cup 400, to facilitate the cooperation between the screw 100 and the strainer 300 to crush the food materials until the juice is produced and the residue is left in the strainer 300.

In an embodiment provided by the present disclosure, the food processor further comprises a dosing cup 500 which is flipped and disposed inside the feeding cup 400, the dosing cup 500 comprises a first feeding port 502 and a second feeding port 504, and the opening size of the first feeding port 502 is larger than the opening size of the second feeding port 504, so that both an upper port and a lower port of the dosing cup 500 can be rotated to face an inner side of the feeding cup 400.

In the embodiment, the dosing cup 500 comprises a first feeding port 502 and a second feeding port 504; the dosing cup 500 can be flipped and disposed inside the feeding cup 400, the positions of the first feeding port 502 and the second feeding port 504 can be interchanged by flipping the dosing cup 500, when putting a small volume of the food materials through the dosing cup 500, the user can place the first feeding port 502 on the upper side of the second feeding port 504, and directly place the food materials in the dosing cup 500 through the first feeding port 502, the food materials enters the feeding cup 400 through the second feeding port 504 under the action of gravity or user-assisted pushing, and the caliber of the first feeding port 502 is small, so that the user can be prevented from putting hands into the feeding cup 400, which improves the safety of the food processor; when the volume of the food materials that the user puts into the dosing cup 500 is too large to enter the feeding cup 400 through the second feeding port 504, the user can put the large volume of the food materials into the dosing cup 500 through the first feeding port 502, and then flip the dosing cup 500 to make the first feeding port 502 locate on the lower side of the second feeding port 504, so that the food materials enters the feeding cup 400 through the first feeding port 502 under the action of gravity or user-assisted pushing, at the same time, the user can be prevented from putting hands into the feeding cup 400, which improves the safety of the food processor. Therefore, when the food materials to be processed for user are too large and it is not convenient to pre-process and separate into small pieces, the food materials to be processed can be easily put into the feeding cup 400.

As shown in FIGS. 8-10, an embodiment of the present disclosure provides a food processor, comprising a host assembly (not shown) provided with a driving device; a food processing cup 200 that can be disposed on the host assembly; and the screw 100 according to any of embodiment, and the screw 100 is rotatably disposed in the food processing cup 200 and can cooperate with the driving device to rotate under the action of the driving device.

A food processor provided according to an embodiment of the present disclosure comprises a host assembly, a food processing cup 200, and a screw 100 disposed within the food processing cup 200, and the host assembly is used for supporting the food processing cup 200 and providing power to the screw 100, to drive the screw 100 to rotate. The food processing cup 200 mainly cooperates with screw 100 to achieve the crushing of the food materials and the separation of juice from residue. At the same time, the food processor provided by the embodiment of the present disclosure comprises the screw 100 provided by any of the embodiments; therefore the food processor provided by the embodiment has all the beneficial effects of the screw 100 provided by any of the embodiments, which are not listed here one by one.

In an embodiment provided by the present disclosure, as shown in FIGS. 8-10, the food processor comprises a strainer 300 installed in the food processing cup 200 and located between the food processing cup 200 and the screw 100.

In the embodiment, the food processor also comprises a strainer 300 installed in the food processing cup 200 and used for cooperating with the screw 100 to separate the juice from residue of the squeezed food materials.

In an embodiment provided by the present disclosure, as shown in FIGS. 8-10, the food processor further comprises a feeding cup 400 that can be covered and installed on the food processing cup 200 for feeding, and, the feeding cup 400 is provided with a matching surface corresponding to the cutting surface 122, and the matching surface can be used for cutting and squeezing the food materials together with the cutting surface 122. Of course, the matching surface can also be matched with the starting end of the first spiral rib 2 to perform preliminary cutting processing on the food materials.

In an embodiment provided by the present disclosure, as shown in FIGS. 8-10, the food processor further comprises a dosing cup rotatably installed in an inlet end of the feeding cup for feeding the food materials into the feeding cup 400.

In one embodiment, the food processor is a dual-cup dual-screw food processor (not shown), that is, the food processor with two cups for crushing and squeezing the food materials and separating the juice from residue of the food materials. Of course, also as shown in FIGS. 8-10, the food processor may also be a single-screw single-cup food processor, that is, the food processor with one cup for crushing and squeezing the food materials and separating the juice from residue of the food materials. At this time, also as shown in FIGS. 8-10, a strainer 300 can be set in the cup body to achieve the separation of the juice from residue of the food materials.

In an embodiment provided by the present disclosure, the food processor is a liquidizer or a juicer, of course, the food processor can also be a product other than the liquidizer and the juicer.

In the description of the present disclosure, it should be understood that the orientation or position relationships indicated by the terms "upper", "lower" and the like are the orientation or position relationships based on what is shown in the drawings, are merely for the convenience of describing the present disclosure and simplifying the description, and do not indicate or imply that the device or unit referred to may have a particular direction and is constructed and operated in a specific orientation, and thus cannot be understood as the limitation of the present disclosure. The terms "connection", "mounting", "fixing" and the like should be understood in a broad sense. For example, "connection" may be a fixed connection, a removable connection or an integral connection; the term "connected" may refer to being directly connected and may also refer to being indirectly connected through an intermediary.

In the description of the present specification, the descriptions of the terms "one embodiment", "some embodiments" and "specific embodiments" and the like mean that specific features, structures, materials or characteristics described in conjunction with the embodiment(s) or example(s) are included in at least one embodiment or example of the present disclosure. In the specification, the schematic representation of the above terms does not necessarily refer to the same embodiment or example. The particular features, structures, materials or characteristics described may be combined in a suitable manner in any one or more embodiments or examples.

What is claimed is:

1. A screw, comprising:
    a screw body including a feeding area for feeding and a crushing area connected to the feeding area;
    a first spiral rib extending along a top of the screw body to a bottom of the screw body, wherein the first spiral rib includes a cutting section and a crushing section, the cutting section is extended to a direction from the top of the screw body toward the bottom of the screw body, the crushing section is continuously connected to the cutting section and extended toward the bottom of the screw body;
    a cutting surface disposed on the feeding area and extending downward from the top of the screw body; and
    a plurality of second spiral ribs disposed on the screw body at intervals along an axial direction of the screw body; wherein
    the cutting surface is one continuous surface;
    the first spiral rib comprises a blade;
    a tip of the blade is disposed at one side of the cutting surface, a top of the cutting surface extends to the tip of the blade; and
    the top of the cutting surface intersects with a top surface of the screw body to form a first intersecting edge, the first intersecting edge connects with the tip of the blade to form a convex angle.

2. The screw according to claim 1, wherein the top surface of the screw body extends to a starting end of the first spiral rib, an angle between the cutting surface and the top surface of the screw body is $\alpha$, and $90° < \alpha \leq 150°$.

3. The screw according to claim 2, wherein the top of the cutting surface intersects with a bottom surface of the first spiral rib to form a second intersecting edge, and both the first intersecting edge and the second intersecting edge extend to the starting end of the first spiral rib.

4. The screw according to claim 3, wherein
    the first intersecting edge is positioned above the second intersecting edge;
    a distance between the first intersecting edge and the second intersecting edge gradually decreases along direction extending to the starting end of the first spiral rib; and a length of the first intersecting edge is greater than a length of the second intersecting edge.

5. The screw according to claim 4, wherein the starting end of the first spiral rib is positioned at the first intersecting edge.

6. The screw according to claim 5, wherein the starting end of the first spiral rib connects with a blade of the first spiral rib.

7. The screw according to claim 6, wherein the second intersecting edge extends to the blade of the first spiral rib.

8. The screw according to claim 7, wherein the starting end of the first spiral rib is positioned at the second intersecting edge.

9. The screw according to claim 3, wherein
the screw body is further provided with a transition surface, one end of the transition surface is continuously connected to one end of the cutting surface, and the other end of the transition surface extends toward the bottom surface direction of the screw body until outer surface of the screw body; and
the transition surface is an arc-shaped surface.

10. The screw according to claim 2, wherein the starting end of the first spiral rib is at least partially disposed on the cutting surface.

11. The screw according to claim 1, wherein the cutting surface is a concave surface.

12. A food processor, comprising a screw and a feeding cup;
wherein the screw comprises:
a screw body including a feeding area for feeding and a crushing area connected to the feeding area;
a first spiral rib extending along a top of the screw body to a bottom of the screw body, wherein the first spiral rib includes a cutting section and a crushing section, the cutting section is extended to a direction from the top of the screw body toward the bottom of the screw body, the crushing section is continuously connected to the cutting section and extended toward the bottom of the screw body; and
a cutting surface disposed on the feeding area and extending downward from the top of the screw body; wherein
a bottom of the feeding cup is provided with a guide surface inclined toward a center direction of the screw, and the guide surface at least partially corresponds to the cutting surface;
the cutting surface is one continuous surface;
the first spiral rib comprises a blade;
a tip of the blade is disposed at one side of the cutting surface, a top of the cutting surface extends to the tip of the blade; and
the top of the cutting surface intersects with a top surface of the screw body to form a first intersecting edge, the first intersecting edge connects with the tip of the blade to form a convex angle.

13. The food processor according to claim 12, wherein the top surface of the screw body extends to a starting end of the first spiral rib, an angle between the cutting surface and the top surface of the screw body is $\alpha$, and $90°<\alpha\leq150°$.

14. The food processor according to claim 13, wherein the top of the cutting surface intersects with a bottom surface of the first spiral rib to form a second intersecting edge, and both the first intersecting edge and the second intersecting edge extend to the starting end of the first spiral rib.

15. The food processor according to claim 14, wherein
the first intersecting edge is positioned above the second intersecting edge;
a distance between the first intersecting edge and the second intersecting edge gradually decreases along direction extending to the starting end of the first spiral rib; and
a length of the first intersecting edge is greater than a length of the second intersecting edge.

16. The food processor according to claim 15, wherein the starting end of the first spiral rib is positioned at the first intersecting edge.

17. The food processor according to claim 16, wherein the starting end of the first spiral rib connects with a blade of the first spiral rib.

18. The food processor according to claim 17, wherein the second intersecting edge extends to the blade of the first spiral rib.

19. The food processor according to claim 18, wherein the starting end of the first spiral rib is positioned at the second intersecting edge.

20. The food processor according to claim 14, wherein
the screw body is further provided with a transition surface, one end of the transition surface is continuously connected to one end of the cutting surface, and the other end of the transition surface extends toward the bottom surface direction of the screw body until outer surface of the screw body; and
the transition surface is an arc-shaped surface.

* * * * *